(12) United States Patent
Thery et al.

(10) Patent No.: US 11,108,456 B2
(45) Date of Patent: Aug. 31, 2021

(54) MODULE FOR GENERATING OPTIONS FOR RADIO SIGNALS RECEPTION

(71) Applicants: Continental Automotive France, Toulouse (FR); Continental Automotive GmbH, Hannover (DE)

(72) Inventors: Laurent Thery, Les Essarts le Roi (FR); Hervé Ducoffe, Le Perray en Yvelines (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/977,660

(22) PCT Filed: Dec. 18, 2018

(86) PCT No.: PCT/EP2018/085672
§ 371 (c)(1),
(2) Date: Sep. 2, 2020

(87) PCT Pub. No.: WO2019/179651
PCT Pub. Date: Sep. 26, 2019

(65) Prior Publication Data
US 2020/0403684 A1    Dec. 24, 2020

Related U.S. Application Data

(60) Provisional application No. 62/645,414, filed on Mar. 20, 2018.

(51) Int. Cl.
H04B 7/00    (2006.01)
H04B 7/08    (2006.01)

(52) U.S. Cl.
CPC .................. H04B 7/0802 (2013.01)

(58) Field of Classification Search
CPC ...... H04B 1/0064; H04B 1/0075; H04B 1/16; H04B 7/08; H04B 1/0003; H04B 1/0007; H04B 1/207; H04B 1/406
See application file for complete search history.

(56) References Cited

U.S. PATENT DOCUMENTS 9,787,388 B1 * 10/2017 Croman .................. H04B 1/16
2017/0288764 A1    10/2017 Croman et al.

FOREIGN PATENT DOCUMENTS

EP        1592140 A2    11/2005

OTHER PUBLICATIONS

International Search Report and Written Opinion for International Application No. PCT/EP2018/085672, dated May 6, 2019, with partial translation, 9 pages.

(Continued)

*Primary Examiner* — Nhan T Le
(74) *Attorney, Agent, or Firm* — RatnerPrestia

(57) ABSTRACT

A module for generating signal-reception options, the module being configured to receive at least one signal transmitted by at least one antenna; the generating module including at least one group of mixers and at least one input module; the at least one group of mixers including a number Y of mixers in which Y is an integer equal to or higher than 1; the at least one input module being coupled to the at least one group of mixers and configured to deliver a number Z of reception options available to receive the at least one signal, the number Z being determined depending at least on the number Y and/or on a number of types of signals received by the at least one group of mixers.

11 Claims, 7 Drawing Sheets

(56) References Cited

OTHER PUBLICATIONS

International Search Report and Written Opinion for International Application No. PCT/EP2018/085672, dated May 6, 2019, 10 pages (French).

* cited by examiner

Fig. 3

| Group of mixers \ Available reception options | (1) |
|---|---|
| 5a | FM |
|  | FM |
| 5b | DAB |
|  | DAB |
| 5c | AM |
|  | AM |

Fig. 5

| Group of mixers \ Available reception options | (1) | (2) | (3) | (4) | (5) | (6) | (7) | (8) | (9) |
|---|---|---|---|---|---|---|---|---|---|
| 5a | FM | FM | FM | FM | FM | FM | FM | FM | FM |
|    | FM | FM | FM | FM | FM | FM | FM | FM | FM |
| 5b | FM | FM | FM | DAB | DAB | DAB | DAB | DAB | DAB |
|    | FM | FM | FM | DAB | DAB | DAB | FM | FM | FM |
| 5c | DAB | AM | DAB | DAB | AM | DAB | DAB | AM | DAB |
|    | DAB | AM | AM | DAB | AM | AM | DAB | AM | AM |

Fig. 7
| Group of mixers \ Available reception options | (1) | (2) | (3) |
|---|---|---|---|
| 5a | FM | FM | FM |
|  | FM | FM | FM |
| 5b | DAB | DAB | DAB |
|  | DAB | DAB | DAB |
| 5c | AM | DAB | AM |
|  | AM | DAB | DAB |
Fig. 8
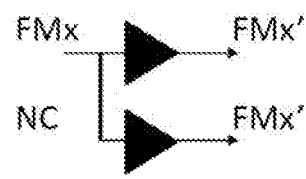
Fig. 9
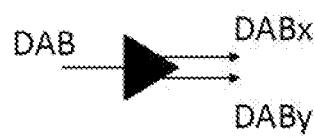
Fig. 10
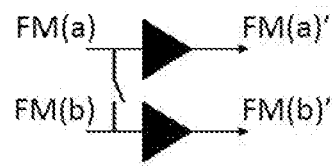

MODULE FOR GENERATING OPTIONS FOR RADIO SIGNALS RECEPTION

CROSS REFERENCE TO RELATED APPLICATIONS

This application is the U.S. National Phase Application of PCT International Application No. PCT/EP2018/085672, filed Dec. 18, 2018, which claims priority to U.S. Provisional Patent Application No. 62/645,414, filed Mar. 20, 2018, the contents of such applications being incorporated by reference herein.

FIELD OF THE INVENTION

The invention generally relates to a module for receiving signals.

The invention more particularly relates to a module for receiving radio-frequency signals installed in a multimedia system of a motor vehicle.

BACKGROUND OF THE INVENTION

A motor vehicle is known to be equipped with a multimedia system comprising a radio receiver. As is known, such a radio receiver is able to receive radio-frequency (RF) signals and in particular FM, AM and DAB signals, FM, AM and DAB standing for "frequency modulation", "amplitude modulation" and "digital audio broadcasting", respectively. These three types of signals, i.e. AM/FM/DAB signals, are transmitted in different frequency bands. For example, according to international standard, AM signals are transmitted in the medium frequency band from 525 to 1705 kHz whereas FM signals are transmitted in the medium frequency band from 88 to 108 MHz.

The multimedia system may comprise a software-defined radio (SDR), so as to process the RF and/or digital signals more efficiently and at lower cost. SDR is a platform capable of dealing with various communication standards with variable signal bandwidths, variable carrier frequencies and variable transmission powers.

An RF signal received, in modulated form, by a radio receiver is subjected to various sensors and to suitable filtering so that the corresponding demodulated RF signal can be rendered under good conditions, in particular in the passenger compartment of a motor vehicle.

Those skilled in the art know the operating principle of a modulated RF signal received by a suitable receiver with a view to being demodulated and then rendered to listeners.

Conventionally, the radio receiver of the vehicle may comprise one or more antennas, one or more mixers, and an antenna-switching matrix compatible with various antenna connections. In a general case, the radio receiver of the vehicle comprises two or three antennas and a plurality of mixers. An example of a radio receiver with an antenna-switching matrix is described in the following paragraphs and illustrated in FIG. 1.

An antenna of the radio receiver may be used to transmit a plurality of signals transmitted in different frequency bands; in other words, an antenna may receive an AM signal and/or an FM signal and/or a DAB signal, but it cannot be used to receive two AM signals or a plurality of FM signals. In the example illustrated in FIG. 1, three antennas a1, a2, a3 are used, to transmit an AM signal, an FM signal and a DAB signal, respectively.

The radio receiver comprises mixers each of which is intended to receive an AM, FM or DAB signal. More precisely, the mixer preserves the signal portion emitted at a particular frequency and rejects the signal portions emitted at the other frequencies.

The switching matrix illustrated in FIG. 1 comprises three inputs e1, e2, e3 and three outputs s1, s2, s3. The three antennas a1, a2, a3 are coupled to one of the three inputs e1, e2, e3, respectively, and the three outputs s1, s2, s3 are coupled to one of the three mixers t1, t2 and t3, respectively. The three inputs e1, e2, e3 each comprise switches the number (i.e. 3 in this example) of which is preferably equal to the number of mixers of the receiver. The switches of the three inputs e1, e2, e3 and the switches of the three outputs s1, s2, s3 are coupled beforehand.

Using these switches, when the antennas a1, a2, a3 receive AM signals, these AM signals are sent to the mixer t1. Similarly, when the antennas a1, a2, a3 receive FM/DAB signals, these FM/DAB signals are sent to the mixers t2/t3. The connections are thus switched depending on the signals received by the three antennas a1, a2, a3. The example illustrated in FIG. 1 shows three connections c1, c2 and c3. The connection c1 is made so that the AM signal transmitted by the antenna a1 is received by the mixer t1. Similarly, the connections c2 and c3 are made so that the FM/DAB signals transmitted by the antennas a2/a3 are received by the mixers t2/t3.

Nevertheless, the use of such a switching matrix increases the cost of manufacturing the radio receiver. In addition, another drawback resides in the degradation of the performance of the RF signals in terms of noise and signal behavior, as a result of passage through the switching matrix.

To solve the aforementioned drawbacks, in the context in which automatic gain control is employed, the present invention aims to provide a module for receiving signals that no longer uses a switching matrix, in order to decrease the degradation of RF-signal performance and manufacturing cost.

SUMMARY OF THE INVENTION

To achieve this result, an aspect of the present invention relates to a module for generating signal-reception options, said module being configured to receive at least one signal transmitted by at least one antenna; the generating module comprising at least one group of mixers and at least one input module. The at least one group of mixers comprises a number Y of mixers in which Y is an integer equal to or higher than 1. The at least one input module being coupled to the at least one group of mixers and configured to deliver a number Z of reception options available to receive said at least one signal, the number Z being determined depending at least on the number Y and/or on a number of types of signals received by the at least one group of mixers.

An aspect of the invention thus allows a plurality of reception options available to receive, by means of the at least one group of mixers, the at least one signal transmitted by the at least one antenna, to be generated. Thus, there is no longer any need to use a switching matrix such as described above. The degradation of the RF-signal performance in terms of noise and signal behavior, and the manufacturing cost of the radio receiver are decreased because of the absence of the switching matrix.

Advantageously, the number Z of reception options is determined depending on at least a number Zi of reception options provided by the at least one group of mixers.

Advantageously, the number Zi of available reception options provided by the at least one group of mixers is determined depending at least on the number Y and/or on a number of types of signals received by the at least one group of mixers.

Preferably, the at least one antenna comprises a plurality of antennas; the number Z of available reception options being equal to or lower than a multiplication of the numbers $Z_i$ of reception options.

Preferably, the types of signals received by the at least one group of mixers in different frequency bands are chosen from the following signals: an AM signal, an FM signal, and a DAB signal.

Advantageously, the at least one group of mixers comprises a plurality of groups of mixers, the signals received by the groups of mixers being transmitted by different antennas and in different frequency bands.

Advantageously, the number of groups of mixers is higher than or equal to the highest value of the numbers of signals transmitted by the at least one antenna.

Preferably, the number Y is equal to 2.

Preferably, the generating module is coupled to at least one processing module configured to carry out computations comprising conversion of the at least one signal to digital and/or digital processing of the signal, the at least one processing module being coupled to a software-defined radio (SDR) so as to demodulate the at least one signal.

An aspect of the invention also relates to a system for processing signals comprising a generating module such as described above, a processing module as mentioned above and an SDR intended to demodulate the at least one signal.

BRIEF DESCRIPTION OF THE DRAWINGS

Other features and advantages of aspects of the invention will become more apparent upon reading the following description. This description is purely illustrative and should be read with reference to the appended drawings, in which:

FIG. 3 illustrates a table of the reception options available to receive signals transmitted by the antenna, according to the example of FIG. 2;

FIG. 5 illustrates a table of the reception options available to receive signals transmitted by the antenna, according to the example of FIG. 4;

FIG. 7 illustrates a table of the reception options available to receive signals transmitted by the antenna, according to the example of FIG. 6;

FIG. 8 schematically illustrates one example of a circuit of an input module according to an aspect of the invention;

FIG. 9 schematically illustrates one example of a circuit of an input module according to an aspect of the invention;

FIG. 10 schematically illustrates one example of a circuit of an input module according to an aspect of the invention.

It will be noted that the figures illustrate the invention in detail with regard to implementation thereof, said figures of course being able, where appropriate, to serve to better define the invention.

DETAILED DESCRIPTION OF THE INVENTION

An aspect of the invention relates to a module 100 for generating signal-reception options, comprising mixers. The generating module 100 is configured, via interaction with at least one processing module and an SDR 8, to generate reception options available to receive at least one signal modulated beforehand then transmitted via at least one antenna. As mentioned above, said at least one signal is an AM, FM or DAB RF signal. An aspect of the invention is nevertheless not limited to AM, FM and/or DAB signals, and is applicable to reception and processing of other RF signals. The generating module 100 according to an aspect of the invention will be described in more detail in the following paragraphs with reference to FIGS. 2 and 4.

The at least one processing module, which is coupled to the generating module 100, is configured to receive and process said at least one signal containing data relating to the modulation applied beforehand to said at least one signal. The at least one processing module for example comprises elements such as an analog-to-digital converter and a digital signal processor (DSP). The SDR 8 coupled to said at least one processing module is configured to demodulate said at least one signal converted to digital and processed by the at least one processing module, on the basis of said data regarding the modulation applied beforehand.

It will be noted that an aspect of the invention is not limited to production of the at least one processing module or to production of the SDR 8. For example, the analog-to-digital converter may be installed in the mixers of the generating module 100 instead of being installed in the at least one processing module. In addition, other equivalent devices and/or elements configured to carry out other computations may be installed in said at least one processing module and/or in the SDR 8, without however departing from the scope of an aspect of the present invention.

Figure 1:
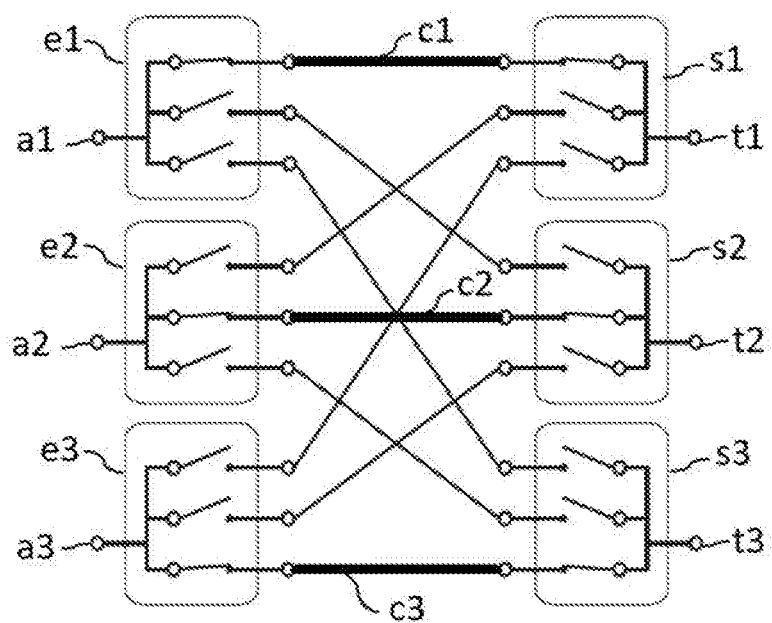
FIG. 1 schematically illustrates a conventional switching matrix.
Figure 2:
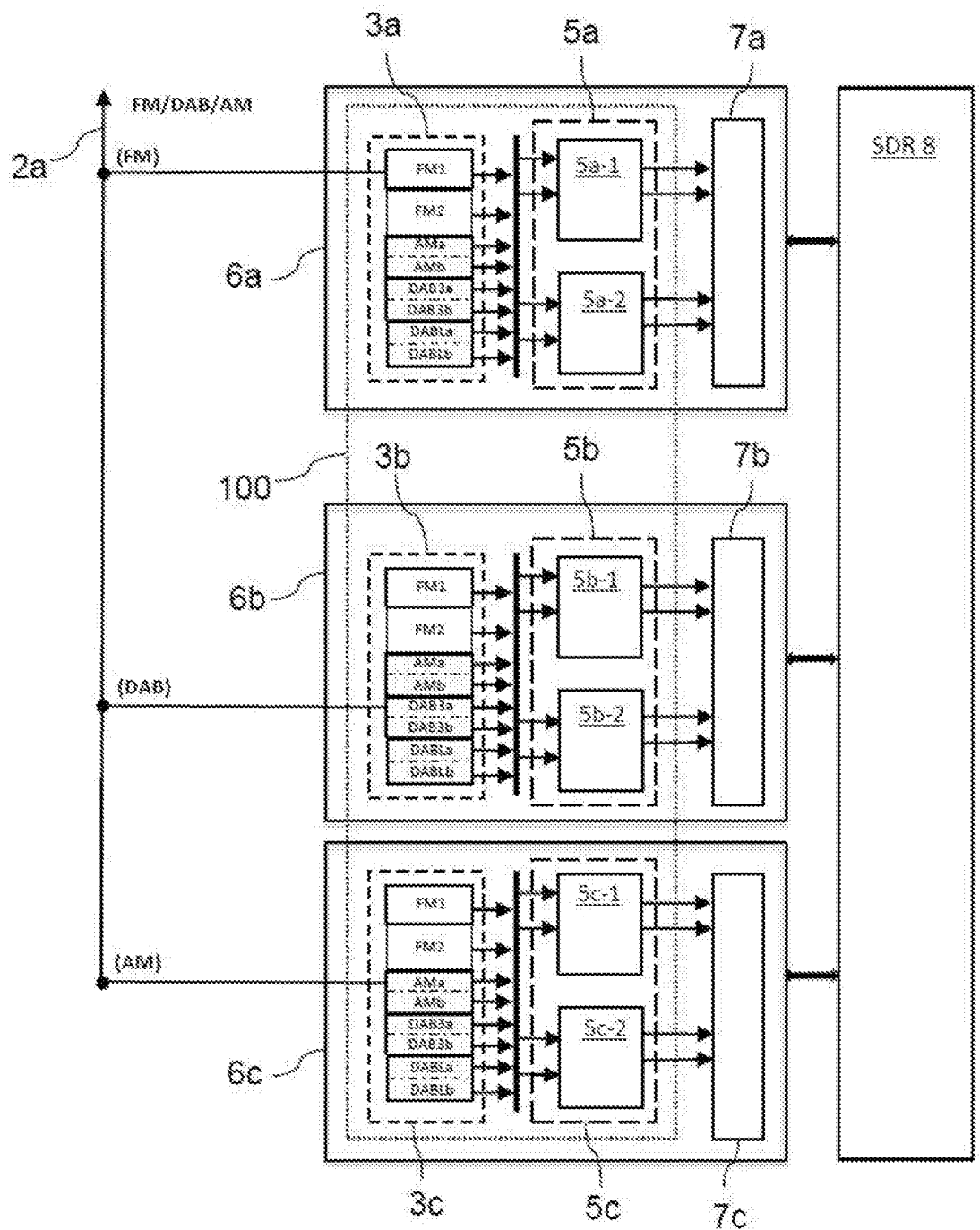
FIG. 2 schematically illustrates a generating module with one antenna according to one embodiment of the invention.
Figure 4:
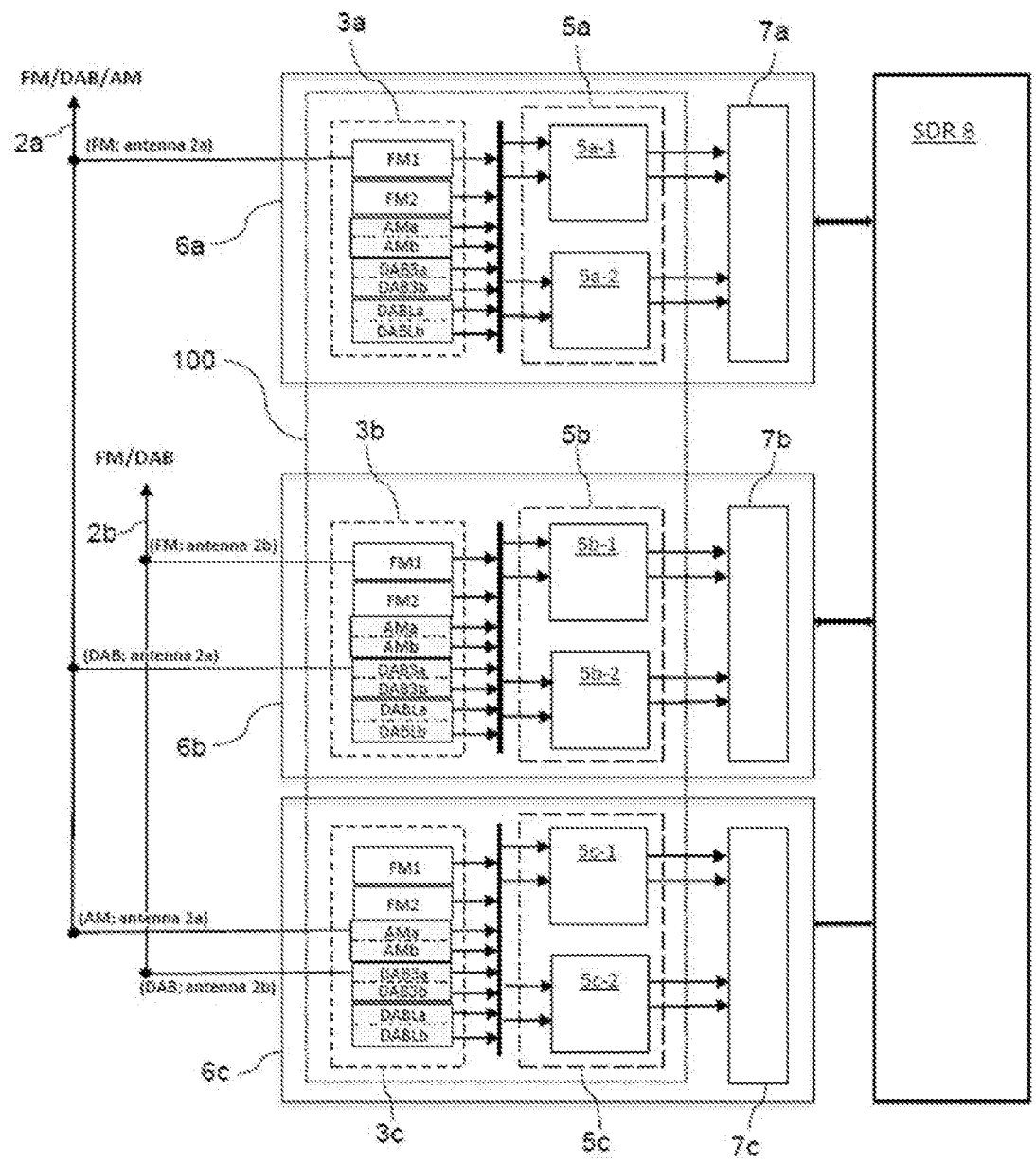
FIG. 4 schematically illustrates a generating module with two antennas according to one embodiment of the invention.

FIGS. 2 and 4 respectively show an example of a generating module 100 with a first antenna 2a in FIG. 2 and with two antennas (including a first antenna 2a and a second antenna 2b) in FIG. 4, according to one embodiment of the invention. FIGS. 3 and 5 show a table of reception options corresponding to the example illustrated in FIG. 2 and to the example illustrated in FIG. 4, respectively. It will be noted that, to facilitate the illustration of the examples, the first antenna 2a of the example of FIG. 2 has been reproduced in the example of FIG. 4.

The generating module 100 is coupled to the at least one antenna, as illustrated in the examples of FIGS. 2 and 4. In addition, as mentioned above, the antennas are each used for the transmission of a number X of RF signals, these RF signals being transmitted in different frequency bands. X is an integer equal to or higher than 1. Taking the example illustrated in FIG. 4, the first antenna 2a is used to transmit/receive three signals of AM, FM and DAB type (i.e. X=3 for the first antenna 2a), and the second antenna 2b is used to transmit/receive two signals of FM and DAB type (i.e. X=2 for the second antenna 2b).

The generating module 100 comprises at least one group of mixers and at least one input module. The at least one input module is configured to manage the mixers of the at least one group of mixers in order to provide reception options available to receive said at least one signal transmitted by the at least one antenna. The determination of the available reception options is described in more detail in the following paragraphs.

The at least one group of mixers comprises one or more groups of mixers. Preferably, the number of groups of mixers is determined depending on the number X of signals transmitted by the antennas. In a case where the antennas are used to transmit various numbers of signals, the number of groups of mixers is higher than or equal to the highest value of the numbers X. Taking the example illustrated in FIG. 4, to provide reception options available to receive the three AM, FM and DAB signals transmitted by the first antenna 2a (i.e. X=3 for the first antenna 2a) and to receive the two FM and DAB signals transmitted by the second antenna 2b (i.e. X=2 for the second antenna 2b), the number of groups of mixers should therefore comprise at least three groups of mixers 5a, 5b and 5c.

In one embodiment, a single input module and/or a single processing module are coupled to a plurality of groups of mixers 5a, 5b and 5c so as to interact with the groups of mixers 5a, 5b and 5c. In one advantageous embodiment, the at least one input module comprises a plurality of input modules 3a, 3b, 3c, and the at least one processing module comprises a plurality of processing modules 7a, 7b, 7c. For a group of mixers 5a, 5b or 5c, one input module and one processing module are dedicated solely to said group of mixers. A group of mixers and its input module and its processing module form a processing unit. Taking the example illustrated in FIG. 2, a processing unit 6a comprises the group of mixers 5a coupled with its input module 3a and its processing module 7a. The processing units 6b and 6c are formed in the same way.

It should be noted that an aspect of the invention is not limited to a single embodiment of the processing units 6a, 6b, 6c. Various equivalent devices may be used to produce the processing units 6a, 6b, 6c, without however departing from the scope of an aspect of the present invention. According to one embodiment, the processing units 6a, 6b, 6c are multi-standard millimeter-wave (MW) modules.

The groups of mixers 5a, 5b, 5c each comprise a number Y of mixers, each number Y being an integer equal to or higher than 1. Preferably, the groups of mixers 5a, 5b, 5c contain the same number Y of mixers. Advantageously, Y is equal to 2 for all the groups of mixers 5a, 5b, 5c, as illustrated in the examples in FIGS. 2 and 4. Preferably, via interaction with the input modules 3a, 3b and 3c, each mixer of the groups of mixers 5a, 5b and 5c is able to auto-adjust its frequency band in order to be capable of receiving the signal transmitted in said frequency band.

Preferably, the at least one input module comprises at least one low-noise amplifier (LNA) configured to form weak received signals delivered by the at least one antenna. In the present embodiment, the processing units 6a, 6b, 6c each comprise one LNA coupled to, or included in, its input module 3a/3b/3c.

As mentioned above, the at least one input module 3a, 3b, 3c determines, via interaction with the SDR 8, a plurality of reception options provided by the at least one group of mixers 5a, 5b, 5c. The input modules 3a, 3b, 3c each comprise a plurality of inputs for the reception of signals by mixers of the group of mixers. As described via the example of FIG. 2, the group of mixers 5a comprises two mixers 5a-1 and 5a-2. The input module 3a coupled to the group of mixers 5a comprises not only inputs FM1, AMa, DAB3a and DABLa to be used by the mixer 5a-1 to receive signals but also inputs FM2, AMb, DAB3b and DABLb to be used by the mixer 5a-2 to receive signals. It will be noted that a single mixer is able to simultaneously receive two signals DAB3a/DABLa, DAB3b/DABLb by virtue of the presence of two outputs of the LNA module of the input module. The input module 3a therefore comprises, for each mixer, two available paths for reception of DAB signals (i.e. paths DAB3a and DABLa for the mixer 5a-1, paths DAB3b and DABLb for the mixer 5a-2). The input modules 3b and 3c respectively have a structure similar to that of the input module 3a. The groups of mixers 5b and 5c respectively have a structure similar to that of the group of mixers 5a.

The number of reception options provided by the generating module 100 is represented by the number Z. In one preferred embodiment, the number Z of reception options available to receive all the signals transmitted by all the antennas is determined depending on the numbers Zi of reception options respectively provided by one of the groups of mixers 5a, 5b, 5c. Advantageously, the number Z of available reception options is equal to or lower than a multiplication of all the numbers Zi of reception options.

Preferably, the number Zi is determined from the number of types of signals (e.g. AM, FM, DAB) received by the corresponding group of mixers. Advantageously, the number Zi is furthermore determined depending on the number Y of mixers of the corresponding group of mixers.

Taking the example illustrated in FIG. 2, the sole antenna 2a is used to transmit three AM, FM and DAB signals. With the configuration of antenna connections of the present example, the FM, DAB and AM signals transmitted by the first antenna 2a are respectively received by the groups of mixers 5a, 5b, 5c. With another configuration of antenna connections (which configuration is not illustrated in the figures), the FM, DAB and AM signals transmitted by said first antenna 2a are respectively received by the groups of mixers 5b, 5c, 5a.

In the example illustrated in FIG. 2, the number Zi of reception options provided by the group of mixers 5a is equal to 1 because the group of mixers 5a receives a single FM signal. The input module 3a comprises a circuit (as illustrated in FIG. 8) that is configured to receive the FM signal transmitted by the first antenna 2a and then to process it and to duplicate it to generate two identical signals FM' that are subsequently respectively received by the input FM1 of the mixer 5a-1 and the input FM2 of the mixer 5a-2. FIG. 8 shows that the circuit has a single input for receiving one signal FMx (e.g. the FM signal transmitted by the first antenna 2a) and two outputs for delivering two identical signals FMx'.

Similarly, the number Zi of reception options provided by the group of mixers 5c is equal to 1 because the group of mixers 5c receives a single AM signal. The input module 3c comprises a circuit similar to that illustrated in FIG. 8.

The number Zi of reception options provided by the group of mixers 5b is equal to 1 when the group of mixers 5b receives a single DAB signal. More precisely, the input module 3b comprises a circuit (as illustrated in FIG. 9) that is configured to receive the DAB signal transmitted by the first antenna 2a and then to process it and to duplicate it to generate two signals DABx and DABy that are respectively received by the input DAB3a of the mixer 5b-1 and the input DAB3b of the mixer 5b-2. Another path is that the input DABLa of the mixer 5b-1 and the input DABLb of the mixer 5b-2 respectively receive the signals DABx and DABy. Nevertheless, the above two paths are considered to be the same reception option. FIG. 9 shows that the circuit has a single input for receiving one DAB signal and two outputs for delivering two signals DABx and DABy.

As described above, the number Z of reception options available to receive all the signals transmitted by the first antenna 2a is equal to 1, this being obtained by multiplying all the three numbers Zi of reception options of the three groups of mixers 5a, 5b, 5c, which are equal to 1, 1 and 1, respectively. In other words, the generating module 100 generates a single reception option available to receive, via the three groups of mixers 5a, 5b and 5c, the three signals transmitted by the first antenna 2a. Said generated reception option is shown in the table illustrated in FIG. 3.

Figure 6:
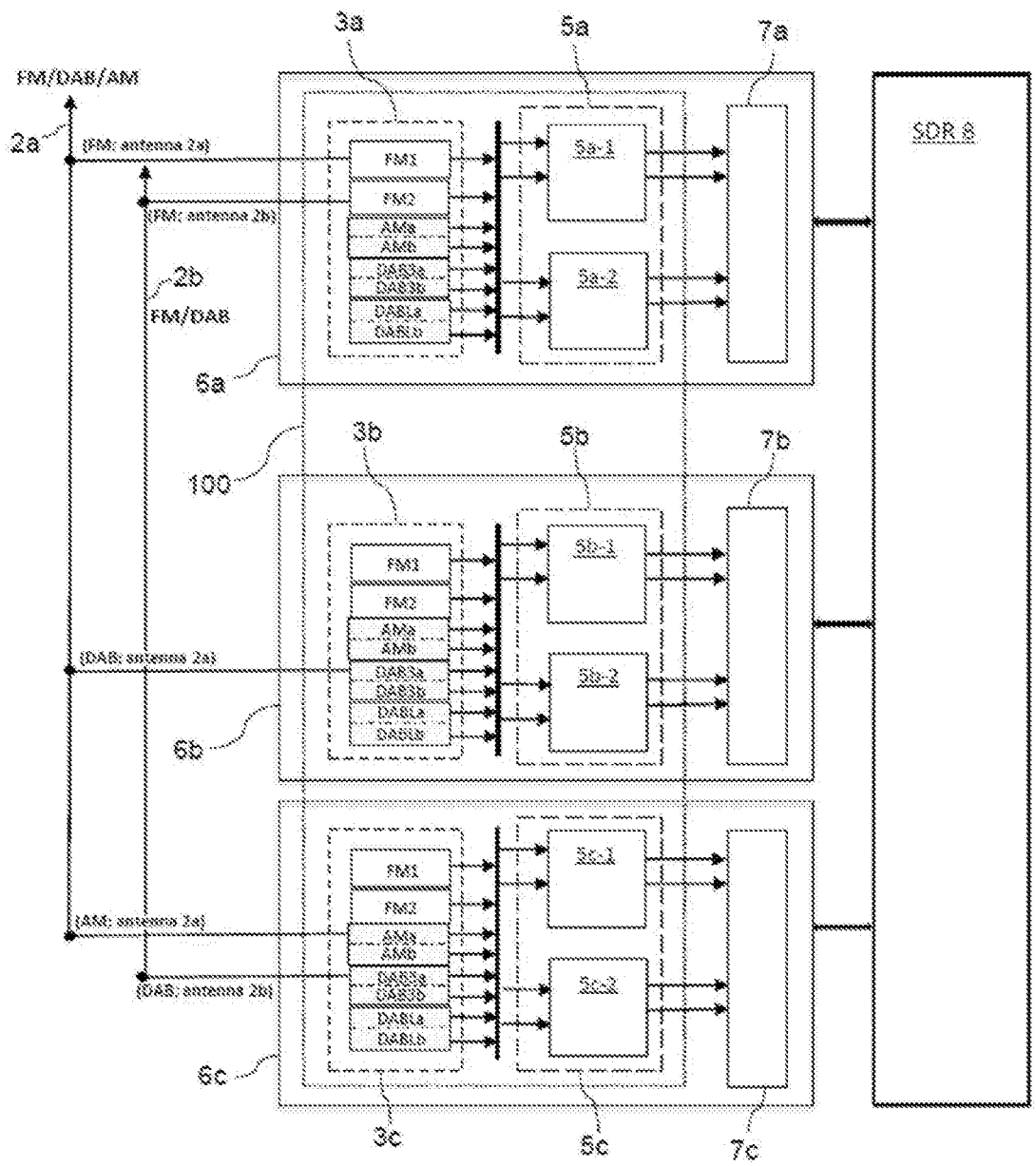
FIG. 6 schematically illustrates a generating module with two antennas according to a different embodiment to that illustrated in FIG. 4.

Taking the example illustrated in FIG. 4, the first antenna 2a is used to transmit three AM, FM and DAB signals and the second antenna 2b is used to transmit two FM and DAB signals. With the configuration of antenna connections of the present example, the FM, DAB and AM signals transmitted by the first antenna 2a are respectively received by the groups of mixers 5a, 5b, 5c. The FM and DAB signals transmitted by the second antenna 2b are respectively received by the groups of mixers 5b and 5c. FIG. 6 illustrates another configuration of antenna connections with the same signals transmitted by the same antennas 2a and 2b but respectively received by different groups of mixers. The example illustrated in FIG. 6 will be described in more detail in the following paragraphs.

In the present example, which is illustrated in FIG. 4, the number Zi of reception options provided by the group of mixers 5a is equal to 1 because the group of mixers 5a receives a single FM signal transmitted by the first antenna 2a.

The number Zi of reception options provided by the group of mixers 5b is equal to 3 because the group of mixers 5b receives a DAB signal transmitted by the first antenna 2a and an FM signal transmitted by the second antenna 2b. The three reception options provided by the group of mixers 5b comprise reception of the only DAB signal transmitted by the first antenna 2a, reception of the only FM signal transmitted by the second antenna 2b, and reception of the two DAB and FM signals respectively transmitted by the antennas 2a and 2b.

Similarly to the computation of the number Zi of reception options provided by the group of mixers 5b, the number Zi of reception options provided by the group of mixers 5c is equal to 3. The three reception options provided by the group of mixers 5c comprise reception of the only AM signal transmitted by the first antenna 2a, reception of the only DAB signal transmitted by the second antenna 2b, and reception of the two AM and DAB signals respectively transmitted by the antennas 2a and 2b.

The number Z of reception options is equal to or lower than 9, this being obtained by multiplying all the three numbers Zi of options of the three groups of mixers 5a, 5b, 5c, which are equal to 1, 3 and 3, respectively. The generating module 100 therefore generates 9 reception options available to receive, by means of the three groups of mixers 5a, 5b and 5c, the five signals three of which are transmitted by the first antenna 2a and two of which are transmitted by the second antenna 2b. A table giving the 9 generated reception options is illustrated in FIG. 5. Specifically, FIG. 4 shows a configuration of the antenna connections that corresponds to reception option (9) of the table illustrated in FIG. 5.

Advantageously, signals received by one of the groups of mixers 5a, 5b, 5c may be transmitted by different antennas and in different frequency bands.

In the present example, which is illustrated in FIG. 6, the number Zi of reception options provided by the group of mixers 5a is equal to 1 when the group of mixers 5a receives two signals of a single FM type, transmitted by the two antennas 2a and 2b, respectively. The input module 3a comprises an open circuit (as illustrated in FIG. 10) configured to receive the two FM signals transmitted by the antennas 2a and 2b and then to process them to generate two signals FM' (respectively corresponding to the two FM signals) that are subsequently respectively received by the input FM1 of the mixer 5a-1 and by the input FM2 of the mixer 5a-2. FIG. 10 shows that the circuit has two inputs for receiving two signals FM(2a) and FM(2b) (e.g. the two FM signals transmitted by the antennas 2a and 2b) and two outputs for delivering two signals FM(2a)' and FM(2b)'. Similarly, in a case where two AM signals transmitted by two different antennas are received by one of the input modules 3a to 3c, said input module comprises an open circuit similar to that illustrated in FIG. 10.

The number Zi of reception options provided by the group of mixers 5b is equal to 1 because, as described above, the group of mixers 5b receives a single DAB signal transmitted by the first antenna 2a.

The number Zi of reception options provided by the group of mixers 5c is equal to 3. The three reception options provided by the group of mixers 5c comprise reception of the only AM signal transmitted by the first antenna 2a, reception of the only DAB signal transmitted by the second antenna 2b, and reception of the two AM and DAB signals respectively transmitted by the antennas 2a and 2b.

The number Z of reception options is equal to or lower than 3, this being obtained by multiplying all the three numbers Zi of options of the three groups of mixers 5a, 5b, 5c, which are equal to 1, 1 and 3, respectively. The generating module 100 therefore generates 3 reception options available to receive, by means of the three groups of mixers 5a, 5b and 5c, the five signals three of which are transmitted by the first antenna 2a and two of which are transmitted by the second antenna 2b. A table giving the 3 generated reception options is illustrated in FIG. 7. Specifically, FIG. 6 shows a configuration of the antenna connections that corresponds to reception option (3) of the table illustrated in FIG. 7.

Thus, the generating module 100 generates a plurality of reception options available to receive, by means of the at least one group of mixers, the at least one signal transmitted by the at least one antenna. The SDR 8, as mentioned above, is able to identify and demodulate said at least one signal, on the basis of said data regarding the modulation applied beforehand before the transmission of said at least one signal and on the basis of the data received from the at least one input module. Thus, there is no longer any need to use a switching matrix such as described above. The degradation of the RF-signal performance in terms of noise and signal behavior, and the manufacturing cost of the radio receiver, are decreased because of the absence of the switching matrix.

It will be noted that the term "to couple" used in this text may correspond to the production of an electrical and wired connection or to a remote connection achieved electromagnetically. Devices used to achieve these connections may be installed and used without however departing from the scope of an aspect of the present invention.

The invention is not limited to the embodiments described above but encompasses any embodiment conforming to its spirit.

The invention claimed is:

1. A generating module for generating signal-reception options, said module being configured to receive at least one signal transmitted by at least one antenna, the generating module comprising:
    group of mixers comprising a number Y of mixers in which Y is an integer greater than 1; and
    an input module coupled to the group of mixers and configured to:
        determine a number Z of reception options available to receive said at least one signal, deliver, via the group of mixers, the number Z of reception options to a software defined radio (SDR), wherein:

each of the Z reception options includes a combination of at least two signals provided to the SDR, the combination of the at least two signals of at least two of the Z reception options are different from one another, and the number Z being an integer greater than 1 and being determined depending at least on the number Y and a number of types of signals received by the at least one group of mixers.

2. The generating module as claimed in claim 1, wherein the number Z of reception options is determined depending on at least a number Zi of reception options provided by the group of mixers.

3. The generating module as claimed in claim 2, wherein the number Zi of available reception options provided by the group of mixers is determined depending at least on the number Y and/or on a number of types of signals received by the group of mixers.

4. The generating module as claimed in claim 2, wherein the antenna comprises a plurality of antennas; the number Z of available reception options being equal to or lower than a multiplication of the numbers Zi of reception options.

5. The generating module as claimed in claim 2, wherein the types of signals received by the group of mixers in different frequency bands are chosen from the following signals: an AM signal, an FM signal, and a DAB signal.

6. The generating module as claimed in claim 1, wherein the group of mixers comprises a plurality of groups of mixers, the signals received by the groups of mixers being transmitted by different antennas and in different frequency bands.

7. The generating module as claimed in claim 6, wherein the number of groups of mixers is higher than or equal to the highest value of the numbers of signals transmitted by the antenna.

8. The generating module as claimed in claim 1, wherein the number Y is equal to 2.

9. The generating module as claimed in claim 1 being coupled to a processing module configured to carry out computations comprising conversion of the at least one signal to digital and/or digital processing of the signal, the at least one processing module being coupled to a software-defined radio so as to demodulate the at least one signal.

10. A system for processing signals comprising a generating module as claimed in claim 9 and a software-defined radio intended to demodulate the at least one signal.

11. The generating module as claimed in claim 3, wherein the antenna comprises a plurality of antennas; the number Z of available reception options being equal to or lower than a multiplication of the numbers Zi of reception options.

* * * * *